United States Patent [19]

O'Brien

[11] 4,076,418

[45] Feb. 28, 1978

[54] FILM SLEWING DEVICE FOR DRUM TYPE CONTACT PRINTER

[75] Inventor: Edward F. O'Brien, Northampton, Mass.

[73] Assignee: The United States of America as represented by the Secretary of the Air Force, Washington, D.C.

[21] Appl. No.: 674,021

[22] Filed: Apr. 5, 1976

[51] Int. Cl.² ............................................. G03B 27/22
[52] U.S. Cl. ..................................... 355/104; 355/117
[58] Field of Search ............... 355/104, 106, 110, 117, 355/105, 107

[56] References Cited

U.S. PATENT DOCUMENTS

| | | | |
|---|---|---|---|
| 2,983,210 | 5/1961 | Baril et al. | 355/106 |
| 3,025,778 | 3/1962 | Stuckens | 355/110 |
| 3,324,292 | 6/1967 | Russell et al. | 355/106 X |
| 3,343,834 | 9/1967 | Mazzio | 355/106 X |
| 3,386,730 | 6/1968 | Hyosaka | 355/110 X |
| 3,704,069 | 11/1972 | Kitch | 355/110 |

Primary Examiner—Fred L. Braun
Attorney, Agent, or Firm—Joseph E. Rusz; Willard R. Matthews, Jr.

[57] ABSTRACT

A film slewing device is incorporated into a contact printer of the type in which a free running inner copy film and a driven outer master film are transported in layered contact on the surface of a free wheeling drum through a light exposure region by use of a master film drive roller and a film coupling pressure roller. The slewing device can selectively provide independent drive of the master film while holding the copy film stationary. This is accomplished by use of a thin arcuate film separating member that is conformed to the outer surface of the drum and that slides on the outer surface of the copy film. The film separating member can be slideably inserted between copy and master films in the region of light exposure. It has idling rollers on its outer surfaces to permit free passage of the outer master film. The pressure roller is disengaged when the separating member is positioned between films to prevent movement of the copy film.

4 Claims, 2 Drawing Figures

FILM SLEWING DEVICE FOR DRUM TYPE CONTACT PRINTER

STATEMENT OF GOVERNMENT INTEREST

The invention described herein may be manufactured and used by or for the Government for governmental purposes without the payment of any royalty thereon.

BACKGROUND OF THE INVENTION

This invention relates to drum type photographic printers, and in particular to devices of that type incorporating film slewing apparatus.

In the operation of contact photographic printing systems it is often required that multiple prints be made from a single section of film. Since most drum type contact printers feed master and copy film through the system light exposure region in a continuous manner (the master film carrying the free running copy film with it) it is difficult and often impossible to do more than provide a single reproduction of the film as it is run through the printer. The problem has in the past been solved by slewing the film. However, in previous equipment which needed slewing the function was usually provided by using an alternate film path with the film being manually moved between paths. Such a method is awkward to perform and adds considerable complexity and expense to the system. There currently exists therefore, the need for a simple, inexpensive method of slewing for drum type contact printing systems. In particular there exists the need for simplified slewing equipment that can be added to devices incorporating silver halide and diazo designs. Such an addition would offer great convenience in making multiple copies of any section of master film webs to be duplicated in these special cases. The present invention is directed toward satisfying these and other needs.

SUMMARY OF THE INVENTION

The invention is a drum type contact printer having film slewing means. It comprises a freely rotating drum, means for transporting a free running copy film over substantially all of the surface of the drum, means for driving a master film in contact with the copy film over a substantial portion of the drum, light exposure apparatus adapted to illuminate the portion of drum occupied by the master film, a pressure roller that bears on the master film and provides a driving force for the copy film, and a film separating means having idler roller bearings on its outer surface. The film separating means is slideable on the copy film and when in position separates the master and copy films by a small amount in the vicinity of the light exposure region. The system operates in an automatic exposure mode when the pressure roller is engaged and the film separating means is moved away from the light exposure region and it operates in a slewing mode of operation when the pressure roller is disengaged and the film separating means is moved between the films and into the light exposure region.

It is a principal object of the invention to provide a new and improved film slewing device for drum type contact printers.

It is another object of the invention to provide a simple, inexpensive method of slewing for drum type contact printing systems.

It is another object of the invention to provide a new and improved means for making multiple copies of any section of a master film web in contact printers incorporating silver halide and diazo designs.

It is another object of the invention to provide a slewing device that effects independent drive of the master film while holding the copy film stationary.

These, together with other objects, features and advantages of the invention, will become more readily apparent from the following detailed description when taken in conjunction with the illustrative embodiments in the accompanying drawings.

DETAILED DESCRIPTION OF THE PREFERRED EMBODIMENT

Figure 1:
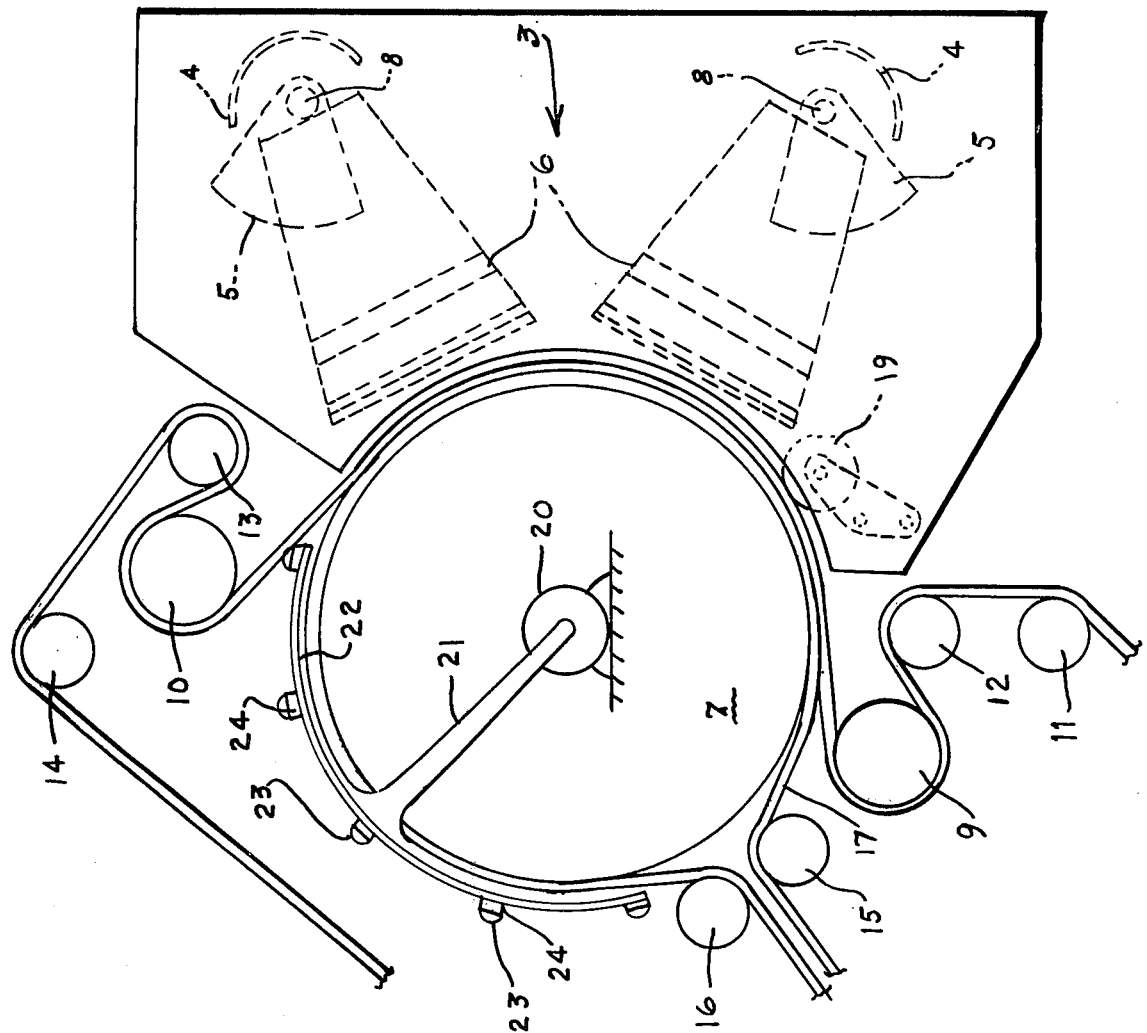
FIG. 1 is a side view of the apparatus of the invention in its automatic exposure mode of operation.
Figure 2:
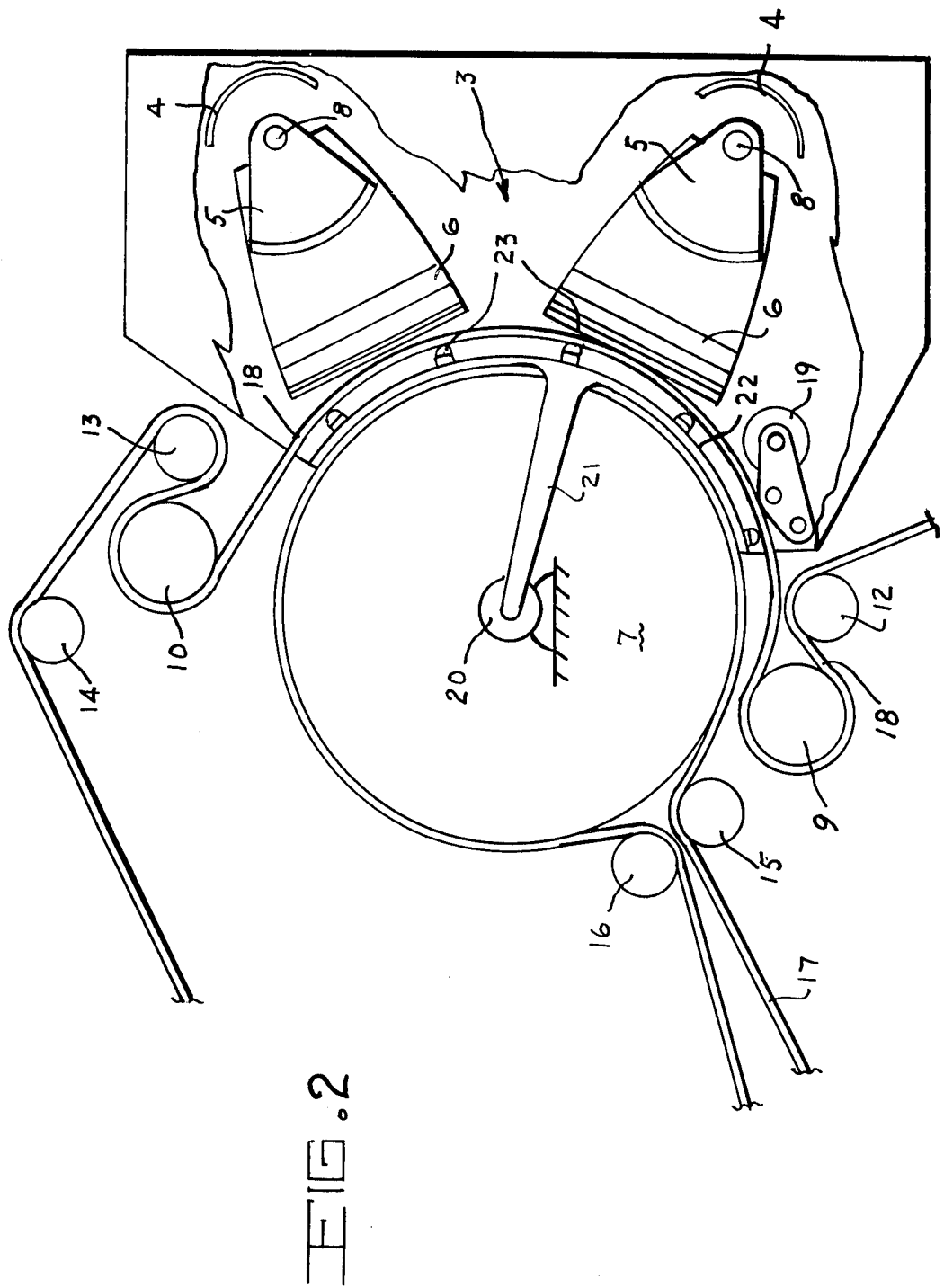
FIG. 2 is a side view of the apparatus of the invention in its film slewing mode of operation.

One presently preferred embodiment of the invention is illustrated in its two modes of operation in FIGS. 1 and 2. Referring now to these drawings, the drum type photographic printer to which the slewing device of the invention is adapted comprises free wheeling exposure drum 7, a feed system for copy film web 17, a feed system for master film web 18, and the light exposure system 3.

The feed system for copy film web 17 consists of idling rollers 15, 16 and other conventional film transporting equipment (not shown) and permits free feeding of the copy film. The feed system for master film web 18 comprises idler rolls 11, 12, 13, 14, brake roller 9, drive roller 10 and other film transporting equipment (not shown). Pressure roller 19, in the automatic exposure mode of operation, bears on master film web 18 and exerts a force on the two webs that causes copy film web 17 to be driven along with the master film web. The light exposure system 3 comprises exposure lamps 8, lamp reflector 4, lamp shutters 5, honeycomb collimators 6 and other standard photographic equipment.

The film slewing apparatus of the invention consists of the thin arcuate sheet member 22, actuating lever arm 21 and motor 20. Sheet member 22 has a plurality of idling cylindrical roller bearings 23 disposed transversely along its outer periphery in slots or receptacles 24. Sheet member 22 thus provides a film separating means which is rotatable about a common axis with the drum 7 and which conforms to the outer surface of the drum and rides on the copy film web 17.

In operation, the film slewing apparatus is driven to the alternate positions of automatic exposure (FIG. 1) and slewing (FIG. 2) by the reversible electric motor 20. This motor is actuated by the operator who makes the choice of the two modes of operation. In the automatic exposure position the film slewing apparatus does not functionally interact with the normal contact printing function. In this case, the drive roll 10 advances the master web 18 across an approximate 150° arc of contact of the drum 7, driving the copy web 17 and the free-wheeling drum 7. In the light exposure region the two films reside in intimate contact so that light emanating from the light sources will produce minimum undercutting due to a separation of master and copy films. It is essential that the arc of contact (approximately 150°) be utilized both so that the illuminated length can be long and so that certain films (diazo sulfonates) can be heated by the hot drum prior to entering the exposure area. This large degree of contact of the drum makes the difficulty of separating the master from the copy much greater than it would have been assuming a very short exposure length over the drum.

When the operator advances the film slewing apparatus to the slewing position (FIG. 2), the master film is lifted away from the copy film. This is accomplished by strategically placing the plurality of small rollers 23 so the separation required between the drum and the exposure assembly can be kept very small while avoiding any touching of the master against the copy web. It is important that the distance between the drum and any openings into the exposure region for a slewing system be minimized to prevent leakage of light.

When in the slewing position as shown in FIG. 2, the master film can be driven in either a forward or reverse direction without sliding over the stationary copy film.

While the invention has been described in its preferred embodiment, it is understood that the words which have been used are words of description rather than words of limitation and that changes within the purview of the appended claims may be made without departing from the scope and spirit of the invention in its broader aspects.

What is claimed is:

1. In a drum type contact printer in which an inner copy film and an outer master film are transported in contact over the portion of a rotatable drum that substantially coincides with the light exposure region of said contact printer, the improvement comprising a film slewing device, said film slewing device comprising
a film separating means configured and arranged for slideable insertion between said copy and master films and having means for providing free transport of said outer master film thereover, said film separating means comprising a thin arcuate sheet member conformed to the outer periphery of said drum and having a length substantially equal to the length of said light exposure region, said arcuate member residing on said inner copy film and being rotatable about the longitudinal axis of said drum, and
means for selectively inserting said film separating means into and out of position between said copy and master films.

2. The film slewing device defined in claim 1 wherein said means for providing free transport of said master film comprises a plurality of cylindrical roller bearings affixed in spaced transverse relationship along the outer surface of said arcuate sheet member.

3. A drum type contact printer having film slewing means comprising
a free wheeling exposure drum,
light exposure means arranged to illuminate a substantial portion of said exposure drum,
means for providing free feeding of a copy film over the surface of said exposure drum,
means for providing a driver feed of a master film in intimate contact with said copy film through the light exposure region,
film separating means configured and arranged for slideable insertion between said copy and master films and having means for providing free transport of said master film thereover, said film separating means comprising a thin arcuate sheet member conformed to the outer periphery of said exposure drum and having a length substantially equal to the length of said light exposure region, said arcuate member residing on said copy film and being rotatable about the longitudinal axis of said exposure drum,
a two-position pressure roller having an engaged position in which it is positioned to bear on said master film and effect positive drive of said copy film with said master film when said film separating means is out of position between said copy and master films and a disengaged position in which it is retracted from contact with said master film when said film separating means is in position between said copy and master film, and
means for selectively inserting said film separating means into and out of position between said copy and master films.

4. A drum type contact printer as defined in claim 3 wherein said means for providing free transport of said master film comprises a plurality of cylindrical roller bearings affixed in spaced transverse relationship along the outer surface of said arcuate sheet member.

* * * * *